(12) United States Patent
Garrec

(10) Patent No.: US 10,786,414 B2
(45) Date of Patent: Sep. 29, 2020

(54) LOWER LIMB OF AN EXOSKELETON OR A BIPEDAL ROBOT

(71) Applicant: COMMISSARIAT A L'ENERGIE ATOMIQUE ET AUX ENERGIES ALTERNATIVES, Paris (FR)

(72) Inventor: Philippe Garrec, Gif-sur-Yvette (FR)

(73) Assignee: COMMISSARIAT A L ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 408 days.

(21) Appl. No.: 14/914,402

(22) PCT Filed: Aug. 29, 2014

(86) PCT No.: PCT/EP2014/068356
§ 371 (c)(1),
(2) Date: Feb. 25, 2016

(87) PCT Pub. No.: WO2015/032696
PCT Pub. Date: Mar. 12, 2015

(65) Prior Publication Data
US 2016/0199978 A1 Jul. 14, 2016

(30) Foreign Application Priority Data
Sep. 6, 2013 (FR) ..................... 13 58603

(51) Int. Cl.
*A61H 1/00* (2006.01)
*A61H 3/00* (2006.01)
(Continued)

(52) U.S. Cl.
CPC ............. *A61H 1/0237* (2013.01); *A61H 3/00* (2013.01); *A61H 2201/1436* (2013.01); *B25J 9/0006* (2013.01)

(58) Field of Classification Search
CPC ......... B25J 9/0006; Y10S 901/01; A61F 5/01; A61F 5/0102; A61F 5/0106; A61H 1/02;
(Continued)

(56) References Cited

U.S. PATENT DOCUMENTS

2006/0276728 A1* 12/2006 Ashihara ............... A61F 5/0102
601/5
2009/0131839 A1 5/2009 Yasuhara
(Continued)

FOREIGN PATENT DOCUMENTS

EP 1 932 499 A1 6/2008
EP 2 193 774 A1 6/2010
(Continued)

OTHER PUBLICATIONS

International Search Report for PCT/EP2014/068356 dated Oct. 20, 2014.

*Primary Examiner* — Quang D Thanh
(74) *Attorney, Agent, or Firm* — Sughrue Mion, PLLC

(57) ABSTRACT

A lower limb of an exoskeleton or a bipedal robot, having a thigh segment (1), a leg segment (3) and a foot (4). The leg segment includes two connecting rods (3a, 3b) having proximal ends that are articulated along parallel axes on the thigh segment, the two connecting rods having distal ends articulated along parallel axes on the foot.

8 Claims, 2 Drawing Sheets

(51) Int. Cl.
*A61H 1/02* (2006.01)
*B25J 9/00* (2006.01)

(58) Field of Classification Search
CPC .... A61H 1/0237; A61H 1/024; A61H 1/0266;
A61H 3/00; A61H 2201/14; A61H
2201/1436; A61H 2201/164; A61H
2201/1642; A61H 2203/0406
See application file for complete search history.

(56) References Cited

U.S. PATENT DOCUMENTS

| | | |
|---|---|---|
| 2010/0270771 A1 | 10/2010 | Kobayashi et al. |
| 2011/0066088 A1 | 3/2011 | Little et al. |
| 2011/0295164 A1* | 12/2011 | Jacobsen .................. A61F 2/68 |
| | | 601/23 |
| 2012/0172770 A1* | 7/2012 | Almesfer ............... B25J 9/0006 |
| | | 601/35 |
| 2013/0197408 A1 | 8/2013 | Goldfarb et al. |

FOREIGN PATENT DOCUMENTS

| | | |
|---|---|---|
| WO | 2009/082249 A2 | 7/2009 |
| WO | 2012/044621 A1 | 4/2012 |

* cited by examiner

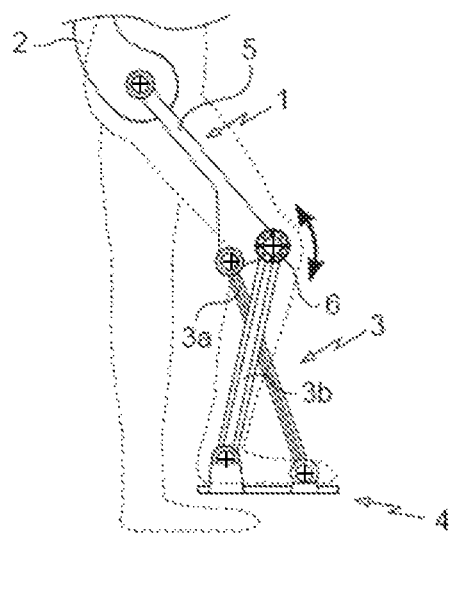
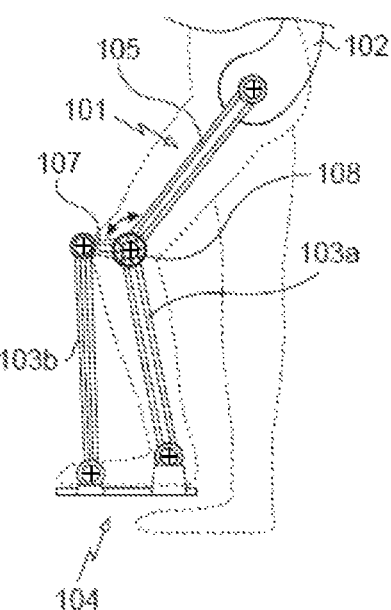
Fig. 1        Fig. 2
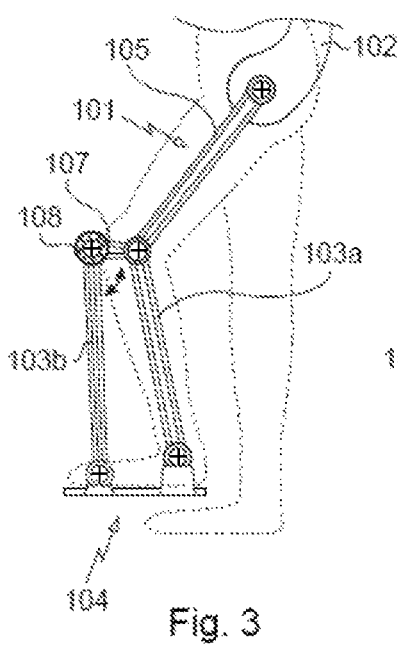
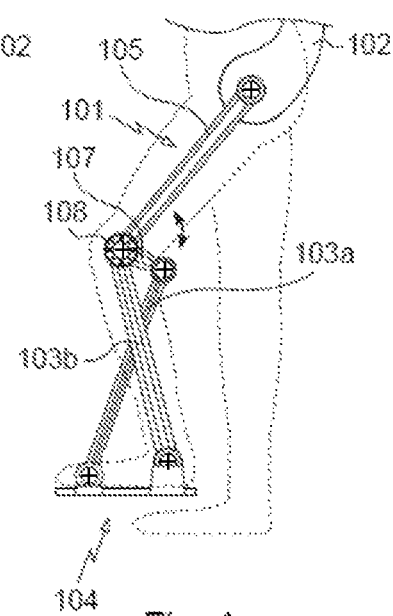
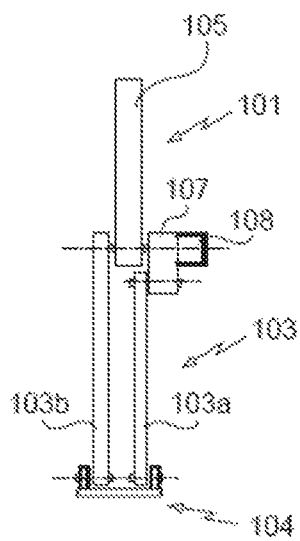
Fig. 3        Fig. 4        Fig. 5

LOWER LIMB OF AN EXOSKELETON OR A BIPEDAL ROBOT

The invention relates to a lower limb of an exoskeleton or of a bipedal robot. Such limbs generally have a thigh segment on which a leg segment is articulated, a foot being articulated on the end of the leg segment. Complete control of the lower limb requires a first actuator for controlling the hip joint between the thigh and a pelvis, a second actuator for controlling the knee joint between the thigh and the leg, and a third actuator for controlling the ankle joint between the leg and the foot.

This latter actuator is generally carried by the leg and constitutes a considerable mass with great offset, leading to a substantial increase in the inertia of the lower leg.

OBJECT OF THE INVENTION

An object of the invention is to make available a lower limb of an exoskeleton or bipedal robot in which the ankle joint can be controlled without the aforementioned disadvantages.

DISCLOSURE OF THE INVENTION

For this purpose, a lower limb of an exoskeleton or bipedal robot is proposed comprising a thigh segment, a leg segment and a foot, in which, according to the invention, the leg segment comprises two connecting rods having proximal ends that are articulated along parallel flexion axes on the thigh segment, the two connecting rods having distal ends articulated along parallel flexion axes on the foot.

Thus, the foot can be controlled by exerting a force on one of the connecting rods of the thigh segment, which can be done by means of an actuator arranged directly on the thigh segment. In this way, the inertia of the leg is preserved, and the inertia of the lower limb is diminished accordingly.

According to a particular embodiment, the first connecting rod is articulated directly on a femur of the thigh segment, while the second connecting rod is articulated on the end of a crank, which is itself articulated on the femur of the thigh segment. Thus, the application, of the force in the connecting rod articulated on the crank can be done by means of an actuator controlling the angular position of the crank on the femur. Preferably, the crank is articulated on the femur along the same axis of articulation as the first connecting rod.

PRESENTATION OF THE FIGURES

The invention will be better understood on reading the following description of a particular non-limiting embodiment of the invention and by referring to the figures of the attached drawings, in which:

FIG. 1 is a schematic view of a lower limb according to a first particular embodiment of the invention;

FIG. 2 is a schematic view of a lower limb according to a second particular embodiment of the invention;

FIG. 3 is a schematic view of lower limb according to an alternative embodiment of the invention;

FIG. 4 is a schematic view of a lower limb according to an alternative embodiment of the invention;

FIG. 5 is a front view of the lower limb from FIG. 4;

Figure 6:
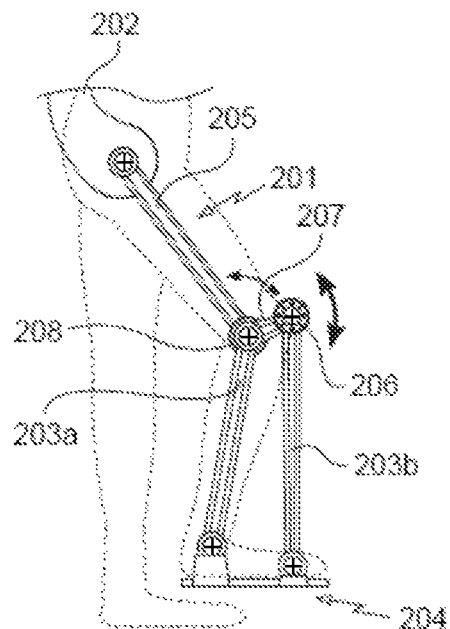
FIG. 6 is a schematic view of a lower limb according to a third particular embodiment of the invention.
Figure 7:
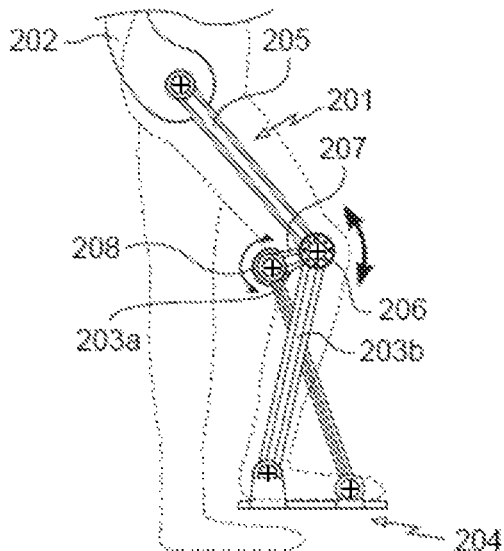
FIG. 7 is a schematic view of a lower limb according to a variant of the invention.
Figure 8:
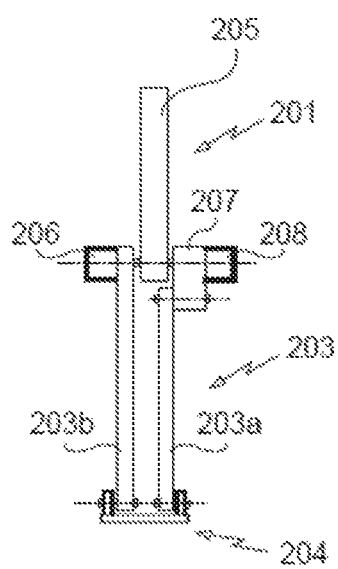

FIG. 8 front view of the lower limb from FIGS. 6 and 7.

DETAILED DESCRIPTION OF EMBODIMENTS OF THE INVENTION

Referring to FIG. 1, and in accordance with a first particular embodiment, the lower segment of the invention successively comprises a thigh segment 1 with a femur 5 having a proximal end articulated on a pelvis 2, a leg segment 3 connected to the thigh segment 1, and a foot 4 connected to the leg segment 3. According to the invention, the leg segment 3 comprises two connecting rods 3a, 3b with respective proximal ends that are articulated on the distal end of the femur 5 along parallel flexion axes, and respective distal ends that are articulated on the foot 4 along parallel flexion axes, in such a way as to form a deformable quadrilateral. An actuator 6 (here a rotary actuator) is arranged here in the area of the articulation of the connecting rod 3b so as to control the angular position of said connecting rod in relation to the femur 5 and thereby to transmit a bending moment.

In this embodiment, the attitude of the foot is directly determined by the angular position of the connecting rod 3b controlled by the actuator 6.

A second particular embodiment of the invention is illustrated in FIGS. 2 to 4, which show similar alternative embodiments and in which the reference signs for the elements in common with FIG. 1 are increased by one hundred. In FIG. 2, one of the connecting rods, namely the connecting rod 103b, is not articulated directly on the femur 105 but at the end of a crank 107 which is mounted pivotably on the femur 105 and of which the angular position in relation to the femur 105 is controlled by an actuator 108. Here, the pivot axis of the crank 107 coincides with the axis of articulation of the other connecting rod 103a. The actuator 108 makes it possible to control the angular position of the foot 104, independently of the position of the leg segment 105 in relation to the thigh segment 101. This arrangement makes it possible, for example, to stand on tiptoe.

In FIG. 3, the crank 107 has been reversed. The actuator 108 now controls the articulation between the crank 107 and the connecting rod 103b.

In these two variants, the crank extends forward and thus constitutes a kind of protection for the knee of the operator, in the case where the lower limb is designed to form part of an exoskeleton.

In FIGS. 4 and 5, the connecting rods 103a and 103b are now crossed, the crank 107 extending rearward of the knee. The various axes of rotation for each member is illustrated by a crosshair.

These three alternative embodiments make it possible to control the attitude of the foot with an actuator located near the knee.

According to a third particular embodiment illustrated in FIGS. 6 and 7, in which the reference signs for the common elements are again increased by one hundred, a crank 207 is once again used to connect one of the connecting rods 203a to 203b to the femur 205. This time the lower segment comprises both an actuator 206 controlling the angular position of the connecting rod 203b with respect to the femur 205 and also an actuator 208 controlling the angular position of the crank 207 with respect to the femur.

The use of two actuators makes it possible to transmit a bending moment between the thigh segment and the leg segment and also to control the attitude of the foot.

Of course, the axis of articulation of the crank on the femur may not coincide with that of the connecting rod which is articulated directly on the femur.

The foot is advantageously provided with sensors for detecting contact with the ground.

In the examples illustrated, the one or more actuators controlling the bottom part of the lower limb are thus set back on the thigh segment, reducing the total inertia of the lower limb.

The invention is not limited to what has just been described, and instead it covers any variant falling within the scope defined by the claims. In particular, although the actuators illustrated here are rotary actuators, it will be possible to use any type of actuator, such as linear actuators, cable jacks, whether electrical, hydraulic, etc. What is more, although the actuators are here arranged directly in the area of the articulations, they will of course be able to be shifted higher, for example in the area of the pelvis.

Although the connecting rods illustrated are of a defined length, they will be able to be of variable length, for example telescopic connecting rods. Finally, the joints will preferably be of the pivot type, although they will also be able to have other degrees of freedom in particular, they will be able to be of the ball-and-socket type.

The invention claimed is:

1. A lower limb of an exoskeleton or bipedal robot, comprising a thigh segment, a leg segment and a foot, wherein the leg segment comprises a first connecting rod and a second connecting rod, each of the first connecting rod and the second connecting rod having a proximal end articulated to the thigh segment at a first joint and a second joint, respectively, the first joint having a first rotational axis and configured to allow the first connecting rod to rotate about the first rotational axis and the second joint having a second rotational axis configured to allow the second connecting rod to rotate about the second rotational axis, wherein in the first joint and the second joint are located on the thigh segment at or near a distal end of the thigh segment, wherein the first rotational axis is separate from and parallel to the second rotational axis, and wherein each of the first connecting rod and the second connecting rod has a respective distal end articulated to the foot at a third joint and a fourth joint, respectively, the third joint having a third rotational axis and the fourth jointing having a fourth rotational axis, each of the third rotational axis and the fourth rotational axis located at or near the foot, and wherein the third rotational axis is separate from and parallel to the fourth rotational axis, and wherein the connecting rods are crossed as viewed in a direction of the first rotational axis and the second rotational axis.

2. The lower limb as claimed in claim 1, in which the thigh segment comprises a femur, each of the first connecting rod and the second connecting rod being articulated directly to the femur, an actuator being arranged to control an angular position of one of the first connecting rod and the second connecting rod with respect to the femur.

3. The lower limb as claimed in claim 1, in which the thigh segment comprises a femur, one of the first connecting rod and the second connecting rod being articulated directly to the femur for movement about one of the first rotational axis and the second rotational axis, while the other of the first connecting rod and the second connecting rod is articulated to an end of a crank mounted rotatably on the femur.

4. The lower limb as claimed in claim 3, in which the crank is articulated to the femur for rotational movement about the one of the first rotational axis and the second rotational axis.

5. The lower limb as claimed in claim 3, in which an actuator is arranged on the thigh segment in order to control an angular position of the crank with respect to the femur.

6. The lower limb as claimed in claim 3, in which an actuator is arranged on the thigh segment in order to control an angular position of the one of the first connecting rod and the second connecting rod being articulated directly to the femur.

7. A lower limb of an exoskeleton or bipedal robot, comprising a thigh segment, a leg segment and a foot, wherein the leg segment comprises a first connecting rod and a second connecting rod, each of the first connecting rod and the second connecting rod having a proximal end articulated to the thigh segment at a first joint and a second joint, respectively, the first joint having a first rotational axis and configured to allow the first connecting rod to rotate about the first rotational axis and the second joint having a second rotational axis and configured to allow the second connecting rod to rotate about the second rotational axis, wherein in the first joint and the second joint are located on the thigh segment at or near a distal end of the thigh segment, wherein the first rotational axis is separate from and parallel to the second rotational axis, and wherein each of the first connecting rod and the second connecting rod has a respective distal end articulated to the foot at a third joint and a fourth joint, respectively, the third joint having a third rotational axis and the fourth having a fourth rotational axis, each of the third rotational axis and the fourth rotational axis located at or near the foot, wherein the third rotational axis is separate from and parallel to the fourth rotational axis, and wherein the thigh segment comprises a single femur having a single hip joint axis and configured to allow rotation of the single femur about the single hip joint axis, the first connecting rod and the second connecting rod are articulated directly to the single femur, such that for the first connecting rod a distance between the single hip joint axis and the first rotational axis is constant during movement of the first connecting rod and for the second connecting rod a distance between the single hip joint axis and the second rotational axis is constant during movement of the second connecting rod, and an actuator is arranged to control an angular position of one of the first connecting rod and the second connecting rod with respect to the single femur.

8. The lower limb of the exoskeleton or bipedal robot as claimed in claim 7, wherein one of the first joint or the second joint comprises the actuator.

* * * * *